(12) United States Patent
Wang

(10) Patent No.: US 11,287,645 B2
(45) Date of Patent: Mar. 29, 2022

(54) CAMERA LENS MODULE

(71) Applicant: AAC Technologies Pte. Ltd., Singapore (SG)

(72) Inventor: Hailong Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 211 days.

(21) Appl. No.: 16/528,573

(22) Filed: Jul. 31, 2019

(65) Prior Publication Data

US 2020/0041784 A1 Feb. 6, 2020

(30) Foreign Application Priority Data

Aug. 4, 2018 (CN) .......................... 201821261987.2

(51) Int. Cl.
*G02B 27/00* (2006.01)
*G02B 7/02* (2021.01)

(52) U.S. Cl.
CPC .......... *G02B 27/0018* (2013.01); *G02B 7/021* (2013.01)

(58) Field of Classification Search
CPC .... G02B 27/0018; G02B 7/021; G02B 7/026; G02B 5/003; G02B 13/18; G02B 7/006; G02B 7/00; G02B 7/02; G02B 5/005; G02B 7/022; G02B 7/023; G02B 7/025; G02B 5/00
See application file for complete search history.

(56) References Cited

U.S. PATENT DOCUMENTS

| 2004/0105173 A1* | 6/2004 | Yamaguchi | G02B 13/18 359/793 |
| 2006/0018041 A1* | 1/2006 | Hirata | G02B 27/0018 359/738 |
| 2014/0160581 A1* | 6/2014 | Cho | G02B 7/02 359/738 |
| 2015/0077839 A1* | 3/2015 | Mizukane | C03B 11/082 359/355 |

FOREIGN PATENT DOCUMENTS

CN 102053325 * 5/2011 ......... G02B 27/0988

OTHER PUBLICATIONS

Machine Translation of CN 102053325 (Year: 2011).*

* cited by examiner

*Primary Examiner* — Darryl J Collins
*Assistant Examiner* — Matthew Y Lee
(74) *Attorney, Agent, or Firm* — W&G Law Group

(57) ABSTRACT

The present disclosure relates to the field of optical image technologies, and provides a camera lens module. The camera lens module includes: a lens barrel including a first barrel wall extending in a horizontal direction and a second barrel wall bent and extending from the first barrel wall; a lens module including at least a first lens and a second lens, the first lens and the second lens being received in the lens barrel sequentially from an image side to an object side; and a light shading sheet provided in the lens barrel and sandwiched between the first lens and the second lens. The second lens includes an optical portion located at a central position and a peripheral portion surrounding the optical portion, and the light shading sheet is embedded in the peripheral portion and fixed to the peripheral portion.

13 Claims, 2 Drawing Sheets

CAMERA LENS MODULE

TECHNICAL FIELD

The present disclosure relates to the field of optical image technologies, and in particular, to a camera lens module.

BACKGROUND

In recent years, portable electronic devices such as smart electronic devices, tablet computers, etc., have been developed rapidly, which have been applied in the life of modern people, and the lens modules loaded on portable electronic devices have also been prospered. However, with the advancement of science and technology, the requirement for the image quality of lens modules becomes higher and higher for the user.

The inventors have found that at least the following problems exist in the related art. A light shading sheet is generally sandwiched and fixed between two lenses. In such case, the light shading sheet between two bumpy-ridge lenses is generally deflected, and the stray light incident into the camera lens module cannot be effectively blocked. The stray light after being reflected or refracted may eventually reach the image surface, thereby resulting in poor image quality of the camera lens module

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
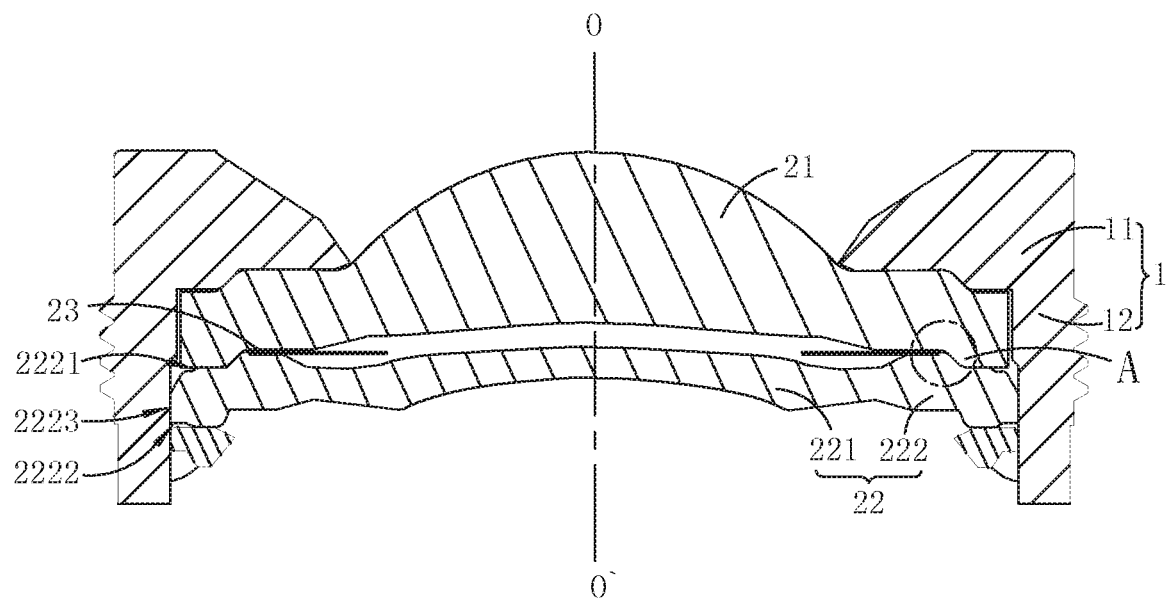
FIG. 1 is a cross-sectional view of a lens module according to an embodiment of the present disclosure.
Figure 2:
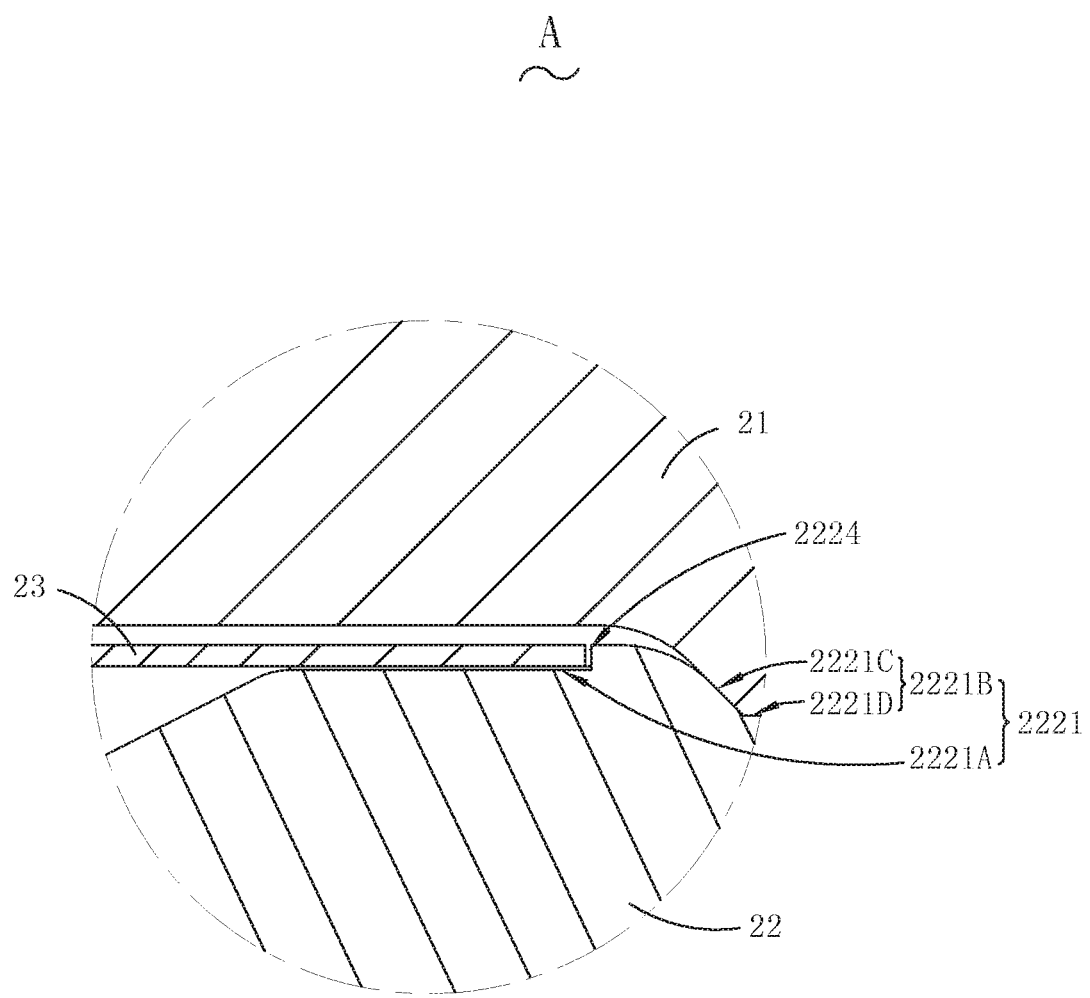
FIG. 2 is a partial enlarged view of a portion A shown in FIG. 1

A first embodiment of the present disclosure provides a camera lens module 100 as shown in FIGS. 1 and 2.

The camera lens module 100 includes a lens barrel 1 and a lens module 2. The lens barrel 1 includes a first barrel wall 11 extending in a horizontal direction and a second barrel wall 12 bent and extending from the first barrel wall 11. The lens module 2 includes at least a first lens 21 and a second lens 22 that are received in the lens barrel 1 sequentially from an image side to an object side. The second lens 22 includes an optical portion 221 located at a central position and a peripheral portion 222 surrounding the optical portion 221. The camera lens module 100 further includes a light shading sheet 23 provided in the lens barrel 1 and sandwiched between the first lens 21 and the second lens 22. The light shading sheet 23 is embedded in the peripheral portion 222 and fixed to the peripheral portion 222.

Compared with the related art, in this embodiment, the light shading sheet 23 in the camera lens module 100 is no longer fixed by mutual clamping between two adjacent lenses, but is embedded and fixed in the peripheral portion 222 of the second lens 22, thereby preventing the light shading sheet 23 between the first lens 21 and the second lens 22 from being deflected due to the instable fixation. This can reduce the influence of the stray light on imaging while improving the stability of the camera lens module 100, thereby improving the image quality of the camera lens module 100.

In an example, the peripheral portion 222 includes an object-side surface 2221 facing towards the object side, an image-side surface 2222 facing towards the image side, and a side surface 2223 connecting the object-side surface 2221 with the image-side surface 2222. The light shading sheet 23 is embedded in the object-side surface 2221.

It should be noted that in this embodiment, the object-side surface 2221 includes a first surface 2221A spaced apart from the first lens 21, and a second surface 2221B abutting against the first lens 21. The peripheral portion 222 is provided with a receiving portion 2224 recessed from the first surface 2221A towards the image-side surface 2222. The light shading sheet 23 is embedded in the receiving portion 2224. With such a structure, the light shading sheet 23 embedded and fixed in the receiving portion 2224 may not directly contact the first lens 21, thereby avoiding position offset due to being subjected to the force of the first lens 21, and further preventing the light shading sheet 23 from being deflected.

As an example, the second surface 2221B includes a first abutting surface 2221C extending from an edge of the first surface 2221A facing away from the optical axis OO' in a direction facing towards the image side and facing away from the optical axis OO', and a second abutting surface 2221D extending from an edge of the first abutting surface 2221C facing away from the first surface 2221A in a direction facing towards the second barrel wall 12. This arrangement increases the contact area between the second surface 2221B and the first lens 21, so that the first lens 21 can be more stably supported on the second lens 22, thereby improving the stability of the camera lens module 100.

It can be appreciated that, in this embodiment, the light shading sheet 23 has a hollow ring shape, and an outer periphery of the light shading sheet 23 is embedded in the receiving portion 2224.

It can be understood that, in order to further improve the stability between the light shading sheet 23 and the second lens 22, the light shading sheet 23 is fixed in the receiving portion 2224 by a binder.

In an example, the first lens 21 is a glass lens, and the second lens 22 is a plastic lens. The glass lens has superior optical properties, is not easy to scratch, and has good light transmittance and a constant refractive index. The plastic lens has a low weight and is not easily damaged.

In another possible embodiment of the present disclosure, the peripheral portion 222 includes an object-side surface 2221 facing towards the object side, an image-side surface 2222 facing towards the image side, and a side surface 2223 connecting the object-side surface 2221 with the image-side surface 2222. The light shading sheet 23 is embedded in the image-side surface 2222.

The above are only preferred embodiments of the present disclosure. Here, it should be noted that those skilled in the art can make modifications without departing from the inventive concept of the present disclosure, but these shall fall into the protection scope of the present disclosure.

What is claimed is:
1. A camera lens module, comprising:
   a lens barrel comprising a first barrel wall extending in a horizontal direction and a second barrel wall bent and extending from the first barrel wall;

a lens module comprising at least a first lens and a second lens, the first lens and the second lens being received in the lens barrel sequentially from an object side to an image side; and a light shading sheet provided in the lens barrel and placed between the first lens and the second lens, wherein the second lens comprises an optical portion located at a central position and a peripheral portion surrounding the optical portion, and the light shading sheet is embedded in the peripheral portion and fixed to the peripheral portion, the light shading sheet doesn't contact the first lens;

wherein the peripheral portion comprises an object-side surface facing towards the object side, an image-side surface facing towards the image side, and a side surface connecting the object-side surface with the image-side surface;

wherein the object-side surface comprises a first surface spaced apart from the first lens and a second surface abutting against the first lens, the peripheral portion is provided with an receiving portion being formed by recessing from the first surface towards the image-side surface, and the light shading sheet is embedded in the receiving portion.

2. The camera lens module as described in claim 1, wherein the second surface comprises a first abutting surface extending from an edge of the first surface facing away from an optical axis in a direction facing towards the image side and facing away from the optical axis, and a second abutting surface extending from an edge of the first abutting surface facing away from the first surface in a direction facing towards the second barrel wall.

3. The camera lens module as described in claim 2, wherein the first lens is a glass lens.

4. The camera lens module as described in claim 3, wherein the second lens is a plastic lens.

5. The camera lens module as described in claim 1, wherein the light shading sheet has a hollow ring shape, and an outer periphery of the light shading sheet is embedded in the receiving portion.

6. The camera lens module as described in claim 5, wherein the first lens is a glass lens.

7. The camera lens module as described in claim 6, wherein the second lens is a plastic lens.

8. The camera lens module as described in claim 1, wherein the light shading sheet is fixed in the receiving portion by a binder.

9. The camera lens module as described in claim 8, wherein the first lens is a glass lens.

10. The camera lens module as described in claim 9, wherein the second lens is a plastic lens.

11. The camera lens module as described in claim 1, wherein the first lens is a glass lens.

12. The camera lens module as described in claim 11, wherein the second lens is a plastic lens.

13. The camera lens module as described in claim 1, wherein the peripheral portion comprises an object-side surface facing towards the object side, an image-side surface facing towards the image side, and a side surface connecting the object-side surface with the image-side surface, and the light shading sheet is embedded in the image-side surface.

* * * * *